Sept. 21, 1943.　　　C. E. KERR　　　2,329,768
CORN HUSKER
Filed Feb. 3, 1940　　　3 Sheets-Sheet 1
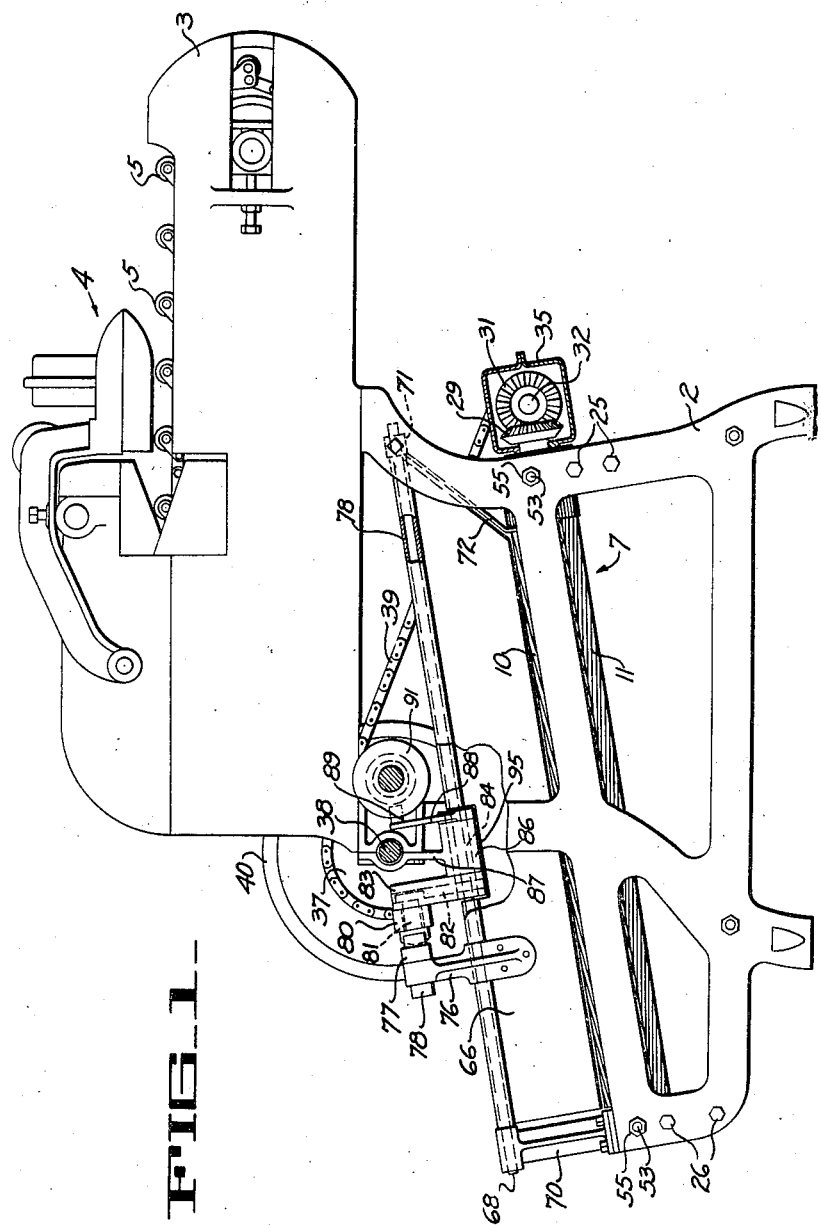
INVENTOR
CHARLES E. KERR
BY Philip G. Minnis
ATTORNEY

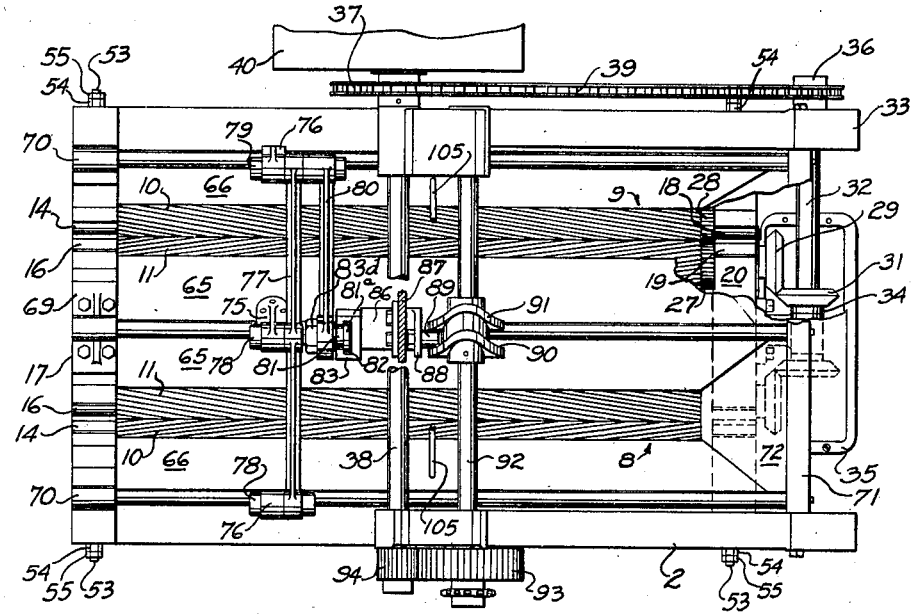

Sept. 21, 1943.  C. E. KERR  2,329,768
CORN HUSKER
Filed Feb. 3, 1940  3 Sheets-Sheet 3
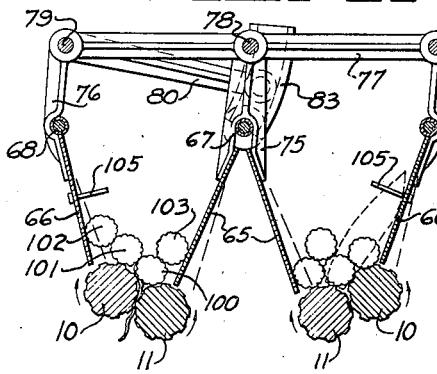
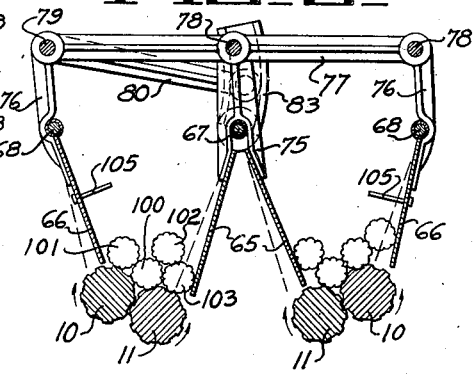
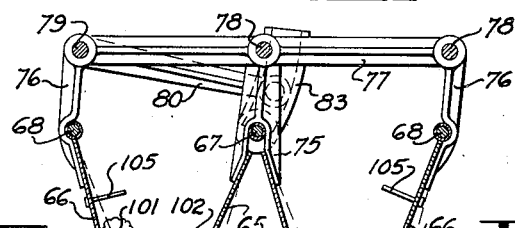
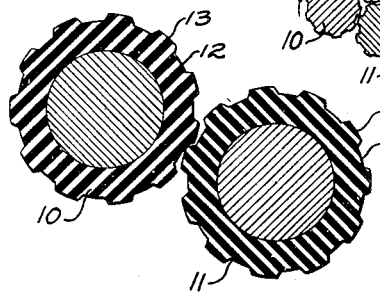
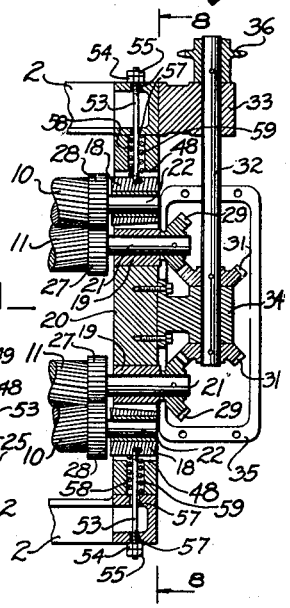
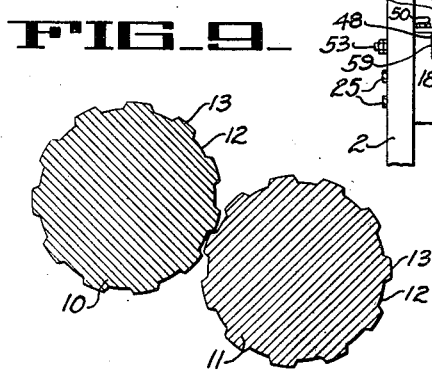
INVENTOR
CHARLES E. KERR
BY Philip A. Minnis
ATTORNEY Patented Sept. 21, 1943

2,329,768

UNITED STATES PATENT OFFICE 2,329,768

CORN HUSKER

Charles E. Kerr, Hoopeston, Ill., assignor to Food Machinery Corporation, San Jose, Calif., a corporation of Delaware Application February 3, 1940, Serial No. 317,199

22 Claims. (Cl. 130—5)

The present invention relates to corn huskers of the type in which the ears are advanced longitudinally along the husking rolls and is concerned more particularly with the provision of improved husking mechanism therefor.

Husking machines of the type referred to herein have always presented considerable difficulty in the discharge of the ears of corn from the husking rolls, due to the fact that frequently an ear will be caught on the rolls so as to prevent its advance, thereby causing the following ears to pile up or congregate in the hopper above the husking rolls, and the machine has to be stopped to permit clearing of the rolls by hand.

It is therefore the primary object of the present invention to provide an improved husking mechanism for corn husking machines of the type referred to herein, in which means are provided for automatically dislodging any ears which may become caught on the rolls, thereby permitting them to resume their advance, so that clogging of the machine is avoided.

Another object is to provide a husking mechanism of the type referred to which includes means operative in case of a pile-up or congregation of ears upon the husking rolls for agitating the mass of ears during such congregation to insure presentation of the individual ears of said mass to the action of the husking rolls.

It is also an object to provide an improved husking roll assembly in which noise, vibration and wear are minimized and in which the advance of the ears along the rolls is facilitated.

Other and further objects of the present invention will become more apparent from the following description and accompanying drawings, in which:

Fig. 1 is a side view of a corn husker of the inclined husking roll type, provided with the improved husking mechanism of the present invention.

Fig. 2 is a plan view of the husking mechanism of the machine shown in Fig. 1.

Fig. 3 is a front view of a portion of the husking machine shown in Fig. 1.

Figs. 4 to 6 inclusive are somewhat diagrammatic sectional views illustrating the operation of the husking mechanism of the present invention.

Fig. 7 is a section through the bearings supporting the forward end of the husking rolls, the drive mechanism for the rolls, and certain portions of the frame structure adjacent the same.

Fig. 8 is a sectional view taken along the lines 8—8 of Fig. 7.

Fig. 9 is a section through a set of cooperating husking rolls.

Fig. 10 is a section through a set of cooperating husking rolls of modified construction.

Referring now to the drawings and especially to Fig. 1, the reference character 2 indicates the frame structure of the corn husking machine upon which is mounted a feed table shown diagrammatically at 3, having suitable debutting and husk-ripping mechanism associated therewith, as diagrammatically indicated at 4. This feed table and its associated debutting and husk-ripping mechanism may be of any conventional construction, although I prefer to employ that shown in U. S. Letters Patent to O. S. Sells and H. J. Wheeler, No. 1,927,957, dated September 26, 1933, in which two parallel rows of corn placed upon the feed table at one end thereof are advanced thereover by flights 5 of an endless conveyor into operative relation with the debutting and husk-ripping mechanism, and then discharged from the table at its far end. Since the present invention is not concerned with the construction of this portion of the machine, it is believed that a detailed illustration and description thereof is unnecessary, reference being made to the Sells and Wheeler patent referred to above if further details of this construction are desired.

The husking mechanism of the machine of the present invention designated by reference numeral 7 is arranged to receive the butted ears discharged from the feed table 3 and comprises two husking units 8 and 9 (see Figs. 2 and 3) each one of which consists of two husking rolls 10 and 11 which are driven in the directions indicated in Figs. 4 to 6 and are preferably formed of solid steel or other metal, as shown in Fig. 9, but which may be covered with rubber, as shown in Fig. 10. In either event, the rolls are provided with oppositely convoluted intermeshing helical grooves and ribs 12 and 13, respectively, the lead of which is preferably such with respect to the minimum length of an ear of corn that the ears deposited upon cooperating rolls extend over a number of convolutions of the grooves and ribs 12 and 13. Thus, due to the fact that the helical corrugations of the rolls are at an angle to the center line of the ear and the latter is supported by several of the ribs 13 throughout its length, pinching of the corn upon rotation of the husking rolls is effectively prevented, and the same is not damaged during the husking operation.

At the same time, the helical form of the grooves and ribs assists in advancing the ears along the rolls, as will be apparent.

The husking rolls 10 and 11 of each husking unit are rotatably mounted in longitudinally and transversely inclined positions within bearings 14 and 16 of a rear bearing plate 17, and bearings 18 and 19 of a front bearing plate 20 by means of roll shafts 21 and 22. The front bearing plate 20 and the rear bearing plate 17 are secured to the frame structure 2 at the front and rear ends thereof by means of screws 25 and 26, respectively.

Keyed upon the husking roll shafts 21 and 22 adjacent the front end of the husking rolls are intermeshing gears 27 and 28, and the roll shafts 21 extend beyond the bearings 19 and are provided with bevel gears 29 which are in cooperative engagement with bevel gears 31 fixed to a drive shaft 32, supported within bearings 33 and 34 secured to the main frame 2 and the front bearing plate 20 in any convenient manner. A casing 35 adjacent the bearing plate 20 encloses the bevel gears 31 and 29, as clearly shown in Figs. 1 and 7, and is adapted to contain a lubricant for providing a smooth operation of these gears. The shaft 32 is provided with a sprocket gear 36 which is keyed thereto and operatively connected with a sprocket gear 37 fixed to a main shaft 38 by means of a sprocket chain 39. The main shaft 38 is provided with a drive pulley 40 adapted to be driven from an electric motor or the like.

From the above, it will therefore be noted that upon rotation of the main shaft 38 the drive shaft 32 is rotated, causing, in turn, rotation of the husking rolls 11 in one direction by means of the bevel gears 31 and 29, while rotation of the husking rolls 10 in a opposite direction is effected by means of the spur gears 28 which intermesh with the gears 27.

It will therefore be seen that the husking rolls of each set are driven in opposite directions, as indicated by the arrows in Figs. 4 to 6, with the result that the husks on the ears of corn placed on the rolls are pinched between the rolls and thereby stripped from the ears. It will be noted that by reason of one of the rolls of each pair being set at a lower elevation than the other, the tractive effect of the lower roll on the ears will be somewhat greater than that of the higher roll, and this causes a gradual rolling of the ears as they pass down the rolls, so that all sides of each ear are presented to the husking action of the rolls.

It will be noted that the fixed husking roll shaft bearings 16 and 19 are mounted within recesses 45 of their respective bearing plates and are rigidly held in place by means of clamp plates 46 secured to the bearing plates by bolts 47 (see Figs. 3 and 8). The bearings 14 and 18, however, are slidably mounted within recesses 48 formed in the bearing plates and confined by guide plates 49 removably secured to the bearing plates by bolts 50. Fixed to the movable bearings 14 and 18 and extending laterally therefrom are adjusting studs 53, which are threaded in their outer ends and provided with an adjustment nut 54 and a lock nut 55. These adjusting studs are freely movable within openings 57 of the main frame 2 and extend through holes 58 in the bearing plates. The holes 58 are of sufficiently large diameter to accommodate coil springs 59 positioned upon the studs 53 intermediate each bearing 18 and the main frame 2.

From the above description it will therefore be observed that by manipulation of the adjusting nuts 54 the movable bearings 14 and 18 may be shifted in a transverse direction with respect to the bearing plates in such a manner as to adjust the husking rolls 10 with respect to the husking rolls 11 with which they cooperate to perform the husking operations. It will furthermore be noted that the husking rolls 10 are yieldably mounted by this arrangement so that they may adjust themselves automatically with respect to the stationary husking rolls 11 and permit the passage of wads of husks, pieces of cob, pebbles, etc., between the husking rolls 10 and 11 without damaging or distorting the same. The rolls 10 may further assume slightly angular positions with respect to the stationary husking rolls 11 and are, so to speak, "floatingly mounted" to thereby eliminate all undue strain between cooperating husking rolls.

It may also be observed at this point, reference being made to Figs. 9 and 10, that the ribs and grooves 13 and 12, respectively, of cooperating husking rolls are not in driving relation with each other; that is to say, the ribs 13 are of lesser width than the grooves 12, so that the side faces of the ribs do not contact the side walls of the grooves, and this relation is maintained in operation by the intermeshing spur gears 27 and 28, which drive the rolls in synchronism. Preferably also, especially if the husking rolls are of metal, the rolls are so positioned as to maintain a slight clearance between the outer faces of the ribs and the bottoms of the grooves into which they project, and this is accomplished by adjusting the nuts 54 and lock nuts 55 so as to hold the rolls 10 slightly away from the rolls 11.

I have found that the clearances referred to in no way interfere with the husking action of the rolls, since the intermeshing relation of the sharp-cornered ribs and grooves enables them to effectively grasp the husks and strip them from the ears. At the same time, the clearance between the side faces of the ribs and the grooves serves to prevent wear on their corners, which would otherwise take place if the ribs and grooves were in driving engagement and would soon impair the husking efficiency of the rolls. The other clearance between the outer faces of the ribs and the bottoms of the grooves also avoids the noise and vibration which would result if there were no clearance at this point, although this clearance is less important where the rolls are rubber-covered.

Mounted above the husking rolls 10 and 11 are partitions or baffles 65 and 66. These partitions are inclined with respect to the rolls and are swingably mounted by means of shafts 67 and 68 rotatably positioned within bearings of supports 69 and 70, secured to the rear bearing plate 17, and a supporting member 71 extending transversely of the upper front end of the main frame 2.

Positioned adjacent the front ends of the partitions 65 and 66 is a stationary plate 72. The partitions 65 and 66 of each husking unit form, in conjunction with the stationary plate 72, husking compartments which are open at their rear ends, as will be clearly seen from Fig. 3.

The inner partitions 65, which are positioned intermediate the husking rolls 11, are provided with an actuating arm 75, which is rigidly attached thereto by means of welding or the like. The outer partitions 66 are provided with an actuating arm 76 rigidly attached to the same. The upper ends of the actuating arms 75 and 76 are interconnected by a transverse link 77, pivotally connected to the same by means of pivot pins 78 and 79. The link 77 is also pivotally attached by means of the pivot pin 79 to an actuating arm 80, the free end of which is provided with a clamp screw 81 having a head 81a extending into a slot 82 of an arcuate arm 83. Threadedly secured to the end of the screw 81 and passing through the arm 80 to abut the arm 83 is a clamp nut 83a for securing the actuating arm 80 in desired positions with respect to the arm 83. The actuating arm 80 is pivotally secured to the arm 83 by means of the adjustable clamp screw 81, and by adjusting the screw 81 within the slot 82 the stroke of the arm 80 may be varied as desired.

Fixed to a sleeve 84 rotatably mounted upon shaft 67 and received within a bearing 86 supported by a transverse portion 87 of the main frame 2 is a roller arm 88 provided with a roller 89 extending into a camway 90 of a rotary cam 91. This rotary cam 91 is fixed upon a cam shaft 92 mounted within the main frame 2 and operatively interconnected with the main shaft 38 by means of spur gears 93 and 94 for rotation therewith. The inner partitions are cut away, as shown at 95 in Fig. 1, to provide sufficient space for mounting the sleeve 84 and arms 83 and 88.

It will therefore be seen that upon rotation of the rotary cam 91, arm 83 will be oscillated, and this oscillating movement is transferred by means of the actuating arm 80, link 77, and arms 75 and 76 to the partitions 65 and 66 to effect an oscillating or swinging movement thereof transversely of the husking rolls 10 and 11.

The operation of the machine of the present invention is as follows:

The ears of corn to be husked are placed in two parallel rows upon the feed table 3 between the flights 5 of the endless feed conveyor, which advances the same past the debutting and husk-ripping devices which prepare the ears for the husking operation in the usual manner. Thereupon, the ears are discharged from the feed table 3 upon the rotating husking rolls 10 and 11 and will be arranged in lengthwise positions upon the rolls by the action of the swinging partitions, or suitable feed chutes may be provided for so positioning the ears, if desired. Such feed chutes are well-known in the art, an example being illustrated in the U. S. Letters Patent to Charles T. Howson No. 1,567,736, dated December 29, 1925.

Due to the lead of the ribs of the husking rolls 10 and 11 and the inclination of the rolls, the ears will travel along cooperating rolls in the valley portions formed therebetween and will be discharged from the rear ends of the rolls. It will be apparent from Figs. 1, 2 and 3 that the helical ribs of the rolls together with the gravitational pull upon the ears of corn due to the downward inclination of the rolls, will give positive downward movement to the ears being husked. Also that the ribs have a very long lead in order to give the ears sufficient time on the rolls for the husking operation. During the travel of the ears of corn along the husking rolls, the ears are rotated so as to present all portions thereof to the husking operation of the rolls and the husks are gripped by the cooperating ribs and grooves of the rolls and are pulled from the ears and passed downwardly between the rolls and discharged from the same.

At the same time, during the operation of the husking rolls above referred to, the partitions 65 and 66 are oscillated in a transverse direction with respect to the husking rolls. These swinging partitions are arranged in such a manner that they do not contact a single ear of corn moving along the husking rolls toward the discharge end of the same.

As heretofore pointed out, it sometimes happens that an ear will be caught on the husking rolls in such a manner as to prevent it from advancing thereover. This situation is ordinarily caused by incomplete butting of the ear by the debutting mechanism associated with the feed table 3, so that one or more of the husks are not severed from the ears sufficiently to permit them to be pulled off readily. As a result, when such an ear is deposited upon the husking rolls the rolls may be unable to pull these improperly severed husks from the ear, but at the same time may grip the husk sufficiently to prevent the ear from advancing along the rolls. Thus, the other ears being discharged from the feed table are deposited on top of the ear which is caught, as indicated in Fig. 4, and unless the offending ear is dislodged the machine will soon clog.

This is prevented, however, by the action of the oscillating partitions 65 and 66, which engage the ears whenever a plurality of them pile upon another, so as to dislodge the ear which is caught, and the operation of the partitions in this respect is illustrated in Figs. 4 to 6 inclusive.

Referring first to Fig. 4, it will be assumed that the ear 100 has been caught in a manner referred to above, so that the ears 101, 102, and 103 have piled up on top of it, and in this position the partitions 65 and 66 are in engagement with the ears 103 and 102, respectively. As the partitions now swing into their extreme right hand positions, as illustrated in Fig. 5, it will be seen that the ear 103 is allowed to settle down upon the roll 11 between the ear 100 and the partition 65. Therefore, when the partitions swing back to their extreme left hand positions, as illustrated in Fig. 6, it will be seen that the partition 65 pushes the ear 103 against the ear 100 and thereby positively shifts the ear 100 out of the valley between the rolls, and the ear 103 takes its place. Upon the next back and forth swinging movement of the partitions, the ear 103 will be likewise pushed out of the valley by the ear 102, which will take its place, and so on.

Thus, the pile-up is broken loose, so that the advance of the ears downward along the rolls is resumed. At the same time, it will be observed that the action of the partitions also insures that each of the ears in the pile-up will be presented to the rolls so that all of them will be properly husked.

If desired, the outer partitions 66 may be provided with a pin 105 projecting into the treating compartments of the husking units 8 and 9, so as to knock over any ears which may spin out of engagement with the husking rolls during the operation of the machine to return the same into the valleys between the husking rolls for proper husking cooperation therewith.

While I have shown and described a preferred embodiment of the present invention, it will be understood that it can be embodied in other forms, and that its scope should be limited only by the scope of the appended claims.

Having thus described my invention and in what manner the same may be used, what I claim as new and desire to protect by Letters Patent is:

1. In a corn husking machine a husking compartment comprising movable side walls, a pair of closely spaced inclined husking rolls disposed at the bottom of said compartment in proximity to said side walls and inclined downwardly toward the discharge end of said compartment, means for rotating said husking rolls in opposite directions to cause said rolls to remove the husks and advance the ears longitudinally of said rolls, and means for oscillating the side walls transversely of the longitudinal axis of said rolls.

2. In a corn husking machine, a husking compartment comprising movable side walls, a stationary end wall and a pair of closely spaced inclined husking rolls disposed at the bottom of said compartment and extending parallel to said movable side walls, means for rotating said husking rolls in opposite directions to remove the husks and advance the ears longitudinally of said rolls, and means for oscillating the said side walls transversely of the longitudinal axis of said rolls incident to the rotation of the same.

3. In a corn husking machine, in combination, a plurality of closely spaced longitudinally extending inclined husking rolls, a plurality of partitions pivotally suspended above said rolls and extending into proximity of the same, said partitions extending parallel to the longitudinal axis of said rolls, means for pivotally suspending said partitions, actuating means for rotating said rolls in opposite directions to remove the husks and advance the ears longitudinally of said rolls, actuating arms on said partitions, a rotary cam, means for rotating said cam incident to the rotation of said rolls, and means intermediate said rotary cam and arms for causing oscillation of said partitions transversely to the longitudinal axis of said rolls upon rotation of said cam.

4. In a corn husking machine, in combination, a plurality of closely spaced longitudinally extending inclined husking means, a plurality of plates pivotally suspended above said husking means and extending into proximity of the same, said plates extending parallel to the longitudinal axis of said husking means, means for pivotally suspending said plates, actuating means for rotating said husking means in opposite directions to remove the husks and advance the ears longitudinally of said rolls, actuating arms on said plates, a rotary cam, means for rotating said cam incident to the rotation of said husking means, and means intermediate said rotary cam and arms for causing oscillation of said plates transversely to the longitudinal axis of said husking means upon rotation of said cam.

5. In a corn husking machine, a husking compartment comprising movable side walls, a stationary end wall, and a plurality of closing spaced longitudinally and transversely inclined husking rolls positioned below said side walls and intermediate the same, means for rotating said husking rolls in opposite directions to remove the husks and advance the ears longitudinally of said rolls, and means for moving the side walls transversely of the longitudinal axis of said rolls.

6. In a corn husking machine in combination, a plurality of longitudinally extending husking rolls positioned adjacent each other, adjustable means for mounting said rolls at a longitudinal and transverse inclination, a plurality of movable partitions above said husking rolls and extending into proximity of the same, means for rotating said rolls in opposite directions to remove the husks and advance the ears longitudinally of said rolls, an actuating bar, means for pivotally connecting said bar with said partitions, a rotary cam, means for rotating said cam incident to the rotation of rolls, actuating means operated by said cam, and means for connecting said actuating means with said bar for causing swinging movement of the partitions transversely of said rolls upon rotation of said cam.

7. In a corn husking machine, in combination, a plurality of longitudinally extending husking rolls positioned adjacent each other, adjustable means for mounting said rolls at a longitudinal and transverse inclination, a plurality of movable partitions above said husking rolls and extending into proximity of the same, means for rotating said rolls in opposite directions to remove the husks and advance the ears longitudinally of said rolls, an actuating bar, means for pivotally connecting said bar with said partitions, a rotary cam, means for rotating said cam incident to the rotation of rolls, actuating means operated by said cam, connecting means for interconnecting said actuating means with said bar for causing swinging movement of the partition upon rotation of said cam, and means for adjusting the connecting means relative to the actuating means for varying the extent of the swinging movement of said partitions.

8. In a corn husking machine, a pair of longitudinally inclined husking rolls adapted to support and husk ears of corn, longitudinal partitions mounted above said rolls for defining a channel through which ears of corn may pass longitudinally of said rolls, and means for agitating said partitions at right angles to the axes of the rolls to free congestion of ears that may occur in said husking channel.

9. A corn husking machine comprising a pair of cooperating parallel husking rolls along which the ears to be husked are longitudinally advanced, ear pushing means arranged upon opposite sides of said pair of rolls adjacent thereto and forming a trough with the rolls at the bottom, means for oscillating said ear pushing means transversely at right angles of the rolls to engage and shift the ears back and forth transversely across the rolls when a plurality of ears are deposited upon the rolls in side by side relation, and means associated with the ear pushing means for maintaining the ears in substantially parallel relation with respect to the husking rolls.

10. A corn husking machine comprising cooperating inclined husking rolls along which the ears to be husked are advanced, and a laterally vibrating open bottom hopper extending along said rolls and over and in proximity to said rolls for engaging and shifting the ears back and forth across the rolls when a plurality of ears are deposited upon the rolls in side by side relation.

11. A corn husking machine comprising cooperating inclined husking rolls along which the ears to be husked are advanced, means for rotating said rolls in opposite directions for removing the husks from the ears, and an open bottom hopper extending along said rolls and over and in proximity to said rolls and transversely movable with respect thereto for engaging and shifting the ears back and forth across the rolls when a plurality of ears are deposited upon the rolls in side by side relation.

12. In a corn husking machine having feed and discharging ends, a pair of rotatable husking rolls having intermeshing surface ribs and having grooves between the ribs of greater width than the ribs, said rolls being positioned to downwardly incline toward the discharge end of the machine, and forming a valley between their adjacent surfaces for supporting and normally maintaining ears of corn therein for husking and said ribs forming continuous helixes of long lead around said rolls; the helixes of one roll being of opposite hand to those of the other and spiraling in such direction as to visually appear to travel toward the discharge end of the machine when said rolls are rotated in a direction toward each other in said valley, and means for rotating said rolls in said direction whereby to effect husking of the ears and advance thereof in the valley between said rolls toward the discharge end of the machine and means for rotating said rolls in synchronism, with the ribs of one roll out of engagement with the ribs of the other.

13. In a corn husking machine, a pair of cooperating husking rolls providing a valley adjacent the bite thereof along which ears to be husked are advanced by said rolls, baffle means extending upwardly from said rolls for maintaining a pile of ears upon said rolls with one of said ears in said valley, said means positioned to oscillate transversely of said rolls in a space adjacent to said valley and remote from the ear therein, and means for oscillating said baffle means for engaging other ears of said pile to dislodge said ear in said valley and present the other ears of said pile to said husking rolls in the movement of the ears along said rolls.

14. In a corn husking machine a pair of cooperating husking rolls providing a valley adjacent the bite thereof along which ears to be husked are advanced by said rolls, baffle members disposed on the opposite sides of said valley and extending upwardly therefrom for maintaining a pile of ears upon said rolls with one of said ears in said valley, said members arranged to oscillate transversely of said rolls in a space adjacent to said valley and remote from the ear therein, and means for simultaneously oscillating said members in the same direction for engaging other ears of said pile to dislodge said ear in said valley and present the other ears of said pile to said husking rolls in the movement of the ears along said rolls.

15. In a corn husking machine, a pair of cooperating transversely inclined ear supporting husking rolls, providing a valley adjacent the bite thereof along which ears of corn to be husked are advanced by said rolls, oppositely disposed baffle members suspended from above said rolls and extending in proximity to said rolls adjacent said valley, one of said members being of greater depth than the other, and said members being arranged to oscillate transversely of said rolls and to confine their movement outside of said valley, and means for oscillating said members.

16. A corn husking machine comprising a pair of husking rolls arranged side by side to form an ear receiving and husking valley therebetween along which ears to be husked may be longitudinally advanced, means for rotating said rolls in opposite directions for removing the husks from the ears, ear pushing means adjacent said rolls on opposite sides of said valley forming a trough with said rolls at the bottom, and means for moving said ear pushing means back and forth transversely of said rolls for agitating the ears of a pile thereof congregated upon said rolls in side by side relation whereby the ears in said valley are dislodged therefrom and replaced by previously superposed ears of said pile.

17. A corn husking machine comprising a pair of husking rolls arranged side by side in a transversely inclined position to form an ear receiving and husking valley therebetween along which ears to be husked may be longitudinally advanced, means for rotating said rolls in oppostie directions for removing the husks from the ears, the transverse inclination of said rolls being so arranged as to normally maintain the ears in said valley, therein, and such that the tractive effect of the lower roll on the ears is greater than that of the higher roll to produce rolling of the ears in said valley, ear pushing means adjacent said rolls on opposite sides of said valley forming a trough with said rolls at the bottom, and means for moving said ear pushing means back and forth transversely of said rolls for agitating the ears of a pile thereof congregated upon said rolls in side by side relation, whereby the ears in said valley are dislodged therefrom and replaced by previously superposed ears of said pile.

18. A corn husking machine comprising a pair of rotary husking rolls arranged in side by side relation to form an ear receiving and husking valley therebetween, means for rotating said rolls in opposite directions to remove the husks from the ears in said valley, one of said rolls being positioned higher than the other roll, and the extent thereof being so arranged that ears in said valley may normally be maintained therein, and such that the lower roll will have a greater tractive effect upon the ears than that of the higher roll to produce rolling of the ears in said valley; a pair of spaced baffles arranged adjacent said rolls on opposite sides of said valley, and means for moving said baffles back and forth transversely of said rolls, said baffles being so arranged and spaced as not to engage ears in said valley engaged with both of said rolls but to engage other ears superposed thereon whereby to dislodge the underlying ears in said valley and replace them with the previously superposed ears.

19. In a corn husking machine, in combination, a plurality of closely spaced longitudinally extending inclined husking rolls forming an ear supporting and husking valley therebetween, movable means above said rolls and on opposite side of said valley, said movable means being also in proximity to said rolls and forming a trough therewith with the rolls at the bottom, means for rotating said rolls in opposite directions for removing the husks from the ears in said valley, means for oscillating said opposite movable means together transversely of said rolls to engage and shift the ears in said valley back and forth across said rolls when a pile of ears are deposited upon the rolls in side by side relation, and means for varying the extent of transverse movement of said movable means with respect to said rolls.

20. In a corn husking machine, a plurality of longitudinally and transversely inclined husking rolls forming an ear supporting and husking valley therebetween, means for rotating said rolls in opposite directions for removing the husks from the ears in said valley, spaced means suspended above said rolls on opposite sides of said valley and extending in proximity to said rolls to form a trough therewith with said rolls at the bottom, and means for moving said spaced means in the same direction back and forth transversely of said rolls for agitating the ears upon congregation of a plurality thereof upon the rolls, whereby the components of said congregation of ears are presented to the husking action of said rolls.

21. In a corn husking machine, a plurality of longitudinally and transversely inclined husking rolls forming an ear supporting and husking valley therebetween along which the ears are to be advanced, means for rotating said rolls in opposite directions for removing the husks from ears in said valley, spaced means pivotally suspended above said rolls on opposite sides of said valley and extending in proximity to said rolls to form a trough therewith having said rolls at the bottom, and means for oscillating said suspended means in the same direction transversely of said rolls for shifting ears of corn congregated upon said rolls with respect to said valley whereby the component ears of said congregation will be husked by said rolls in the movement of the ears therealong.

22. A corn husking machine comprising a pair of husking rolls arranged in side by side relation to form an ear supporting and husking valley therebetween, a pair of spaced baffles mounted above said rolls and on opposite sides of said valley, said baffles forming a trough for the ears of corn with the rolls forming the bottom of the trough, and means for oscillating said baffles back and forth transversely of said rolls, said baffles being so arranged and spaced as not to engage the ears traveling in said valley adjacent the bite of said rolls but to engage any other ears superposed thereon whereby to dislodge the underlying ears in said valley and replace them with the previously superposed ears.

CHARLES E. KERR.

CERTIFICATE OF CORRECTION.

Patent No. 2,329,768.                                              September 21, 1943.

CHARLES E. KERR.

It is hereby certified that error appears in the printed specification of the above numbered patent requiring correction as follows: Page 4, first column, line 58, claim 5, for "closing" read --closely--; and second column, line 74, claim 12, for "discharging" read --discharge--; and that the said Letters Patent should be read with this correction therein that the same may conform to the record of the case in the Patent Office.

Signed and sealed this 30th day of November, A.D. 1943.

(Seal)

Henry Van Arsdale,
Acting Commissioner of Patents.